United States Patent [19]

Hammond et al.

[11] Patent Number: 4,899,262
[45] Date of Patent: Feb. 6, 1990

[54] ATTACHMENT ARRANGEMENT FOR VEHICLE TAIL LAMP ASSEMBLY

[75] Inventors: Kenneth W. Hammond, Detroit; Herbert W. Gilbert, Royal Oak; Gerald E. Swierb, Plymouth, all of Mich.

[73] Assignee: Chrysler Motors Corporation, Highland Park, Mich.

[21] Appl. No.: 308,925

[22] Filed: Feb. 13, 1989

[51] Int. Cl.[4] .............................................. B60Q 1/26
[52] U.S. Cl. .................................... 362/80; 362/249; 362/396; 362/432
[58] Field of Search .................. 362/80, 82, 249, 396, 362/432

[56] References Cited

U.S. PATENT DOCUMENTS

| | | | |
|---|---|---|---|
| 4,532,578 | 7/1985 | Gaden | 362/368 |
| 4,569,007 | 2/1986 | Dick | 362/82 |
| 4,742,435 | 5/1988 | Van Duyn | 362/80 |
| 4,831,503 | 5/1989 | DeSantis | 362/80 |

Primary Examiner—Douglas Hart
Attorney, Agent, or Firm—Edward A. Craig

[57] ABSTRACT

An attachment arrangement for a vehicle lamp assembly, including a lamp housing having a top secured to the vehicle, a bottom, and a plurality of upper and lower locating flanges, a one-piece mounting clip having an upper and lower clip portion connected to one respective pair of flanges, and a guide funnel for guiding a jack screw through the respective clip portions and flanges, and a clip having a resilient leg for biasing the bottom of the lamp housing forwardly towards the vehicle as a result of the jack screw being driven against the leg.

10 Claims, 3 Drawing Sheets

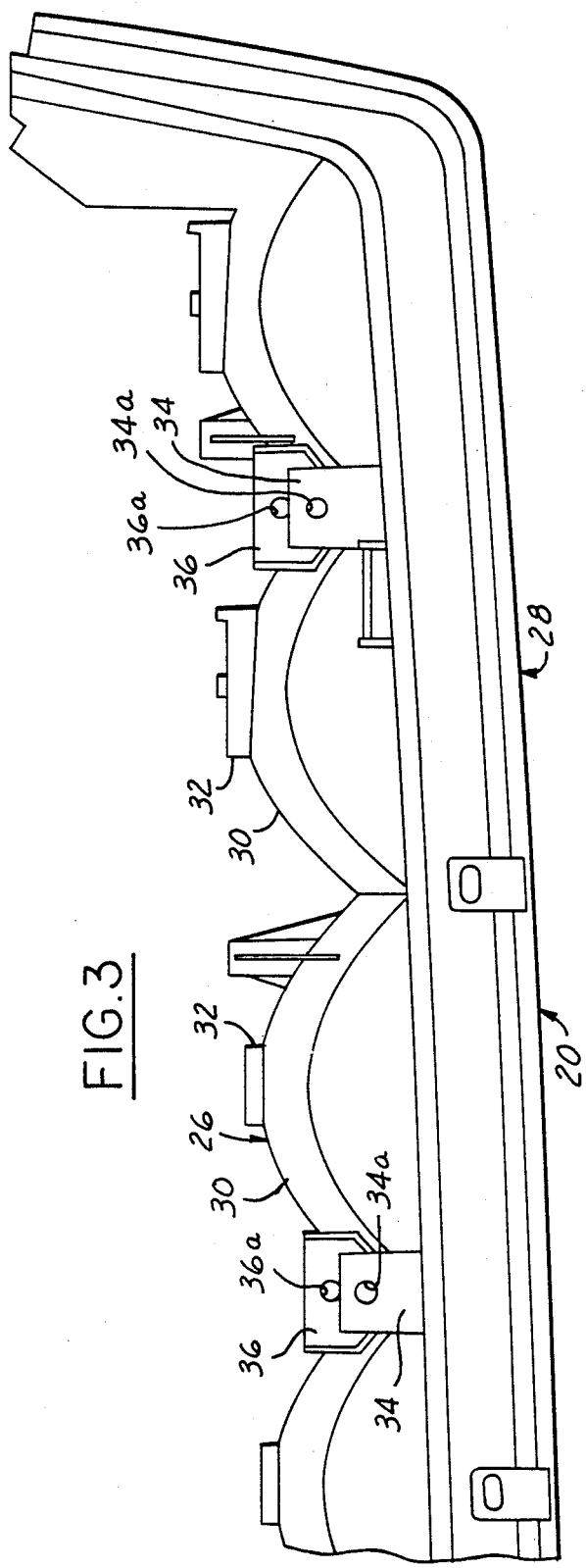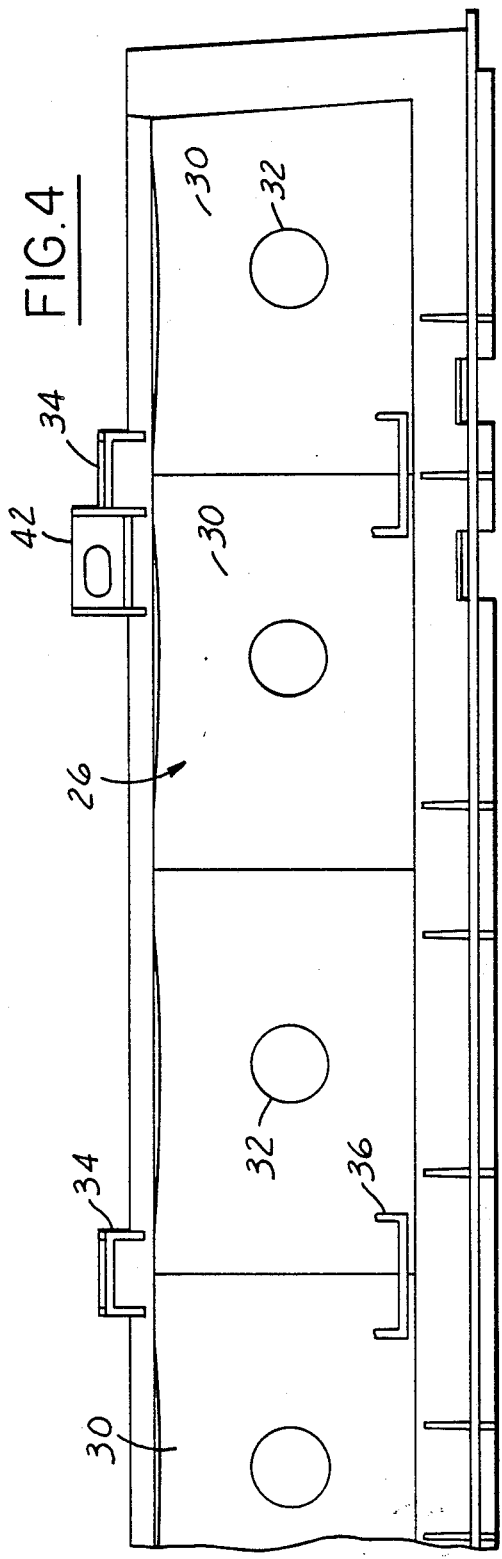

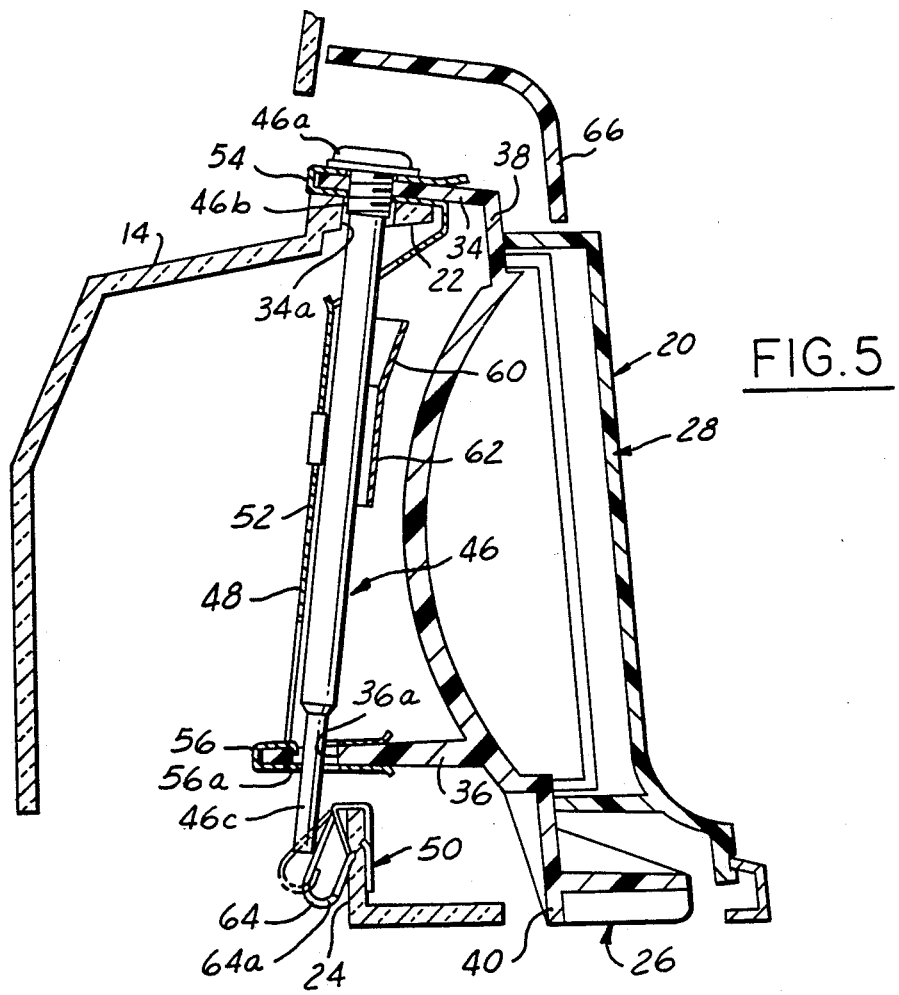
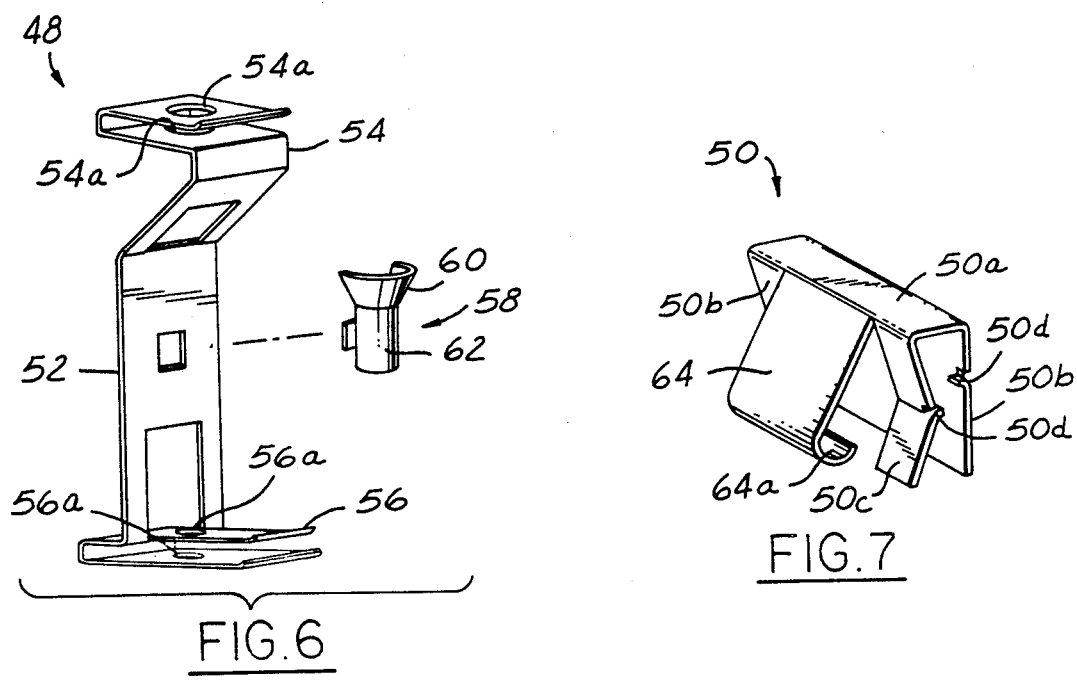

ATTACHMENT ARRANGEMENT FOR VEHICLE TAIL LAMP ASSEMBLY

BACKGROUND AND SUMMARY OF THE INVENTION

The present invention relates to a lamp assembly for an automotive vehicle and, more particularly, to an attachment arrangement for the lamp assembly.

U.S. Pat. No. 4,532,577, issued July 30, 1985 to Sheldon, discloses an "Adjustable Seating Arrangement For A Tail Lamp Assembly" wherein a tail lamp means is attached to a rear panel on the vehicle by a jack screw interfitting three specially configured, vertically separated, spring clips, the tail lamp assembly being assembled beneath stops extending rearwardly from the rear panel. Downward advancement of the jack screw causes the tail lamp assembly to be moved forwardly and vertically upward against the stops to seat same so that adjacent ends of the tail lamp lenses are flush with each other and such that other lenses of the assembly are in alignment with adjacent body structure of the vehicle. Positioning and vertically aligning the separate clips so that they stay in one place during mounting of a wide tail lamp assembly could be a problem. Further, to manufacture and maintain an inventory of different clips is expensive.

While the Sheldon apparatus is possibly suitable for its intended purposes there is always a need for improvements which are less expensive to assemble and manufacture while still providing an aesthetic cover overlying the top of the vehicle housing such that the fastening arrangements are hidden from sight.

The present invention is directed to a novel construction and arrangement of parts, enabling rapid and efficient mounting of a tail lamp assembly. One object is reduction of unnecessary parts without loss of function. An advantage of a one-piece spring clip herein is enhancement of the user being able to rapidly vertically position a jack screw for drawing the lamp assembly forwardly towards the vehicle panel. Further objects, novel characteristics and advantages of the present invention will be apparent to those skilled in the art to which it relates and from which the following detailed description of the illustrated, preferred embodiment thereof made with reference to the accompanying drawings forming a part of this specification in which similar reference numerals are employed to designate corresponding parts throughout the several views, and in which:

BRIEF DESCRIPTION OF THE DRAWINGS

FIG. 3 is a partial top plan view of the tail lamp assembly of FIG. 1;

FIG. 4 is an interior elevation view of the tail lamp assembly of FIG. 1;

FIG. 5 is a fragmentary sectional view of the tail lamp assembly and its mounting to the vehicle in accordance with the present invention;

FIG. 6 shows detail of a one-piece spring clip having a pilot guide in accordance with the present invention; and FIG. 7 shows detail of a "U" shaped clip with resilient leg in accordance with the present invention.

DETAILED DESCRIPTION OF THE PREFERRED EMBODIMENT

Figure 1:
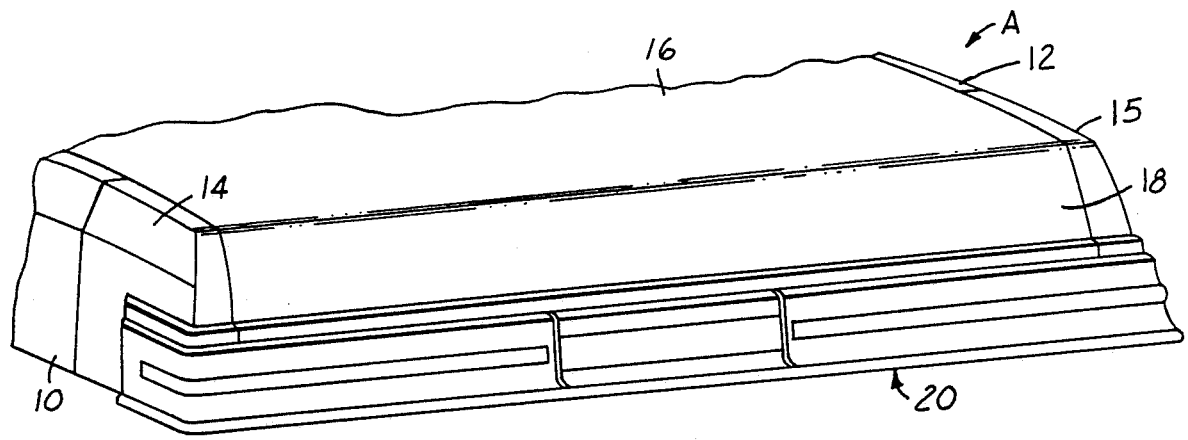
FIG. 1 is a fragmentary perspective view of a rear of an automotive vehicle embodying a tail lamp assembly in accordance with the present invention.
Figure 2:
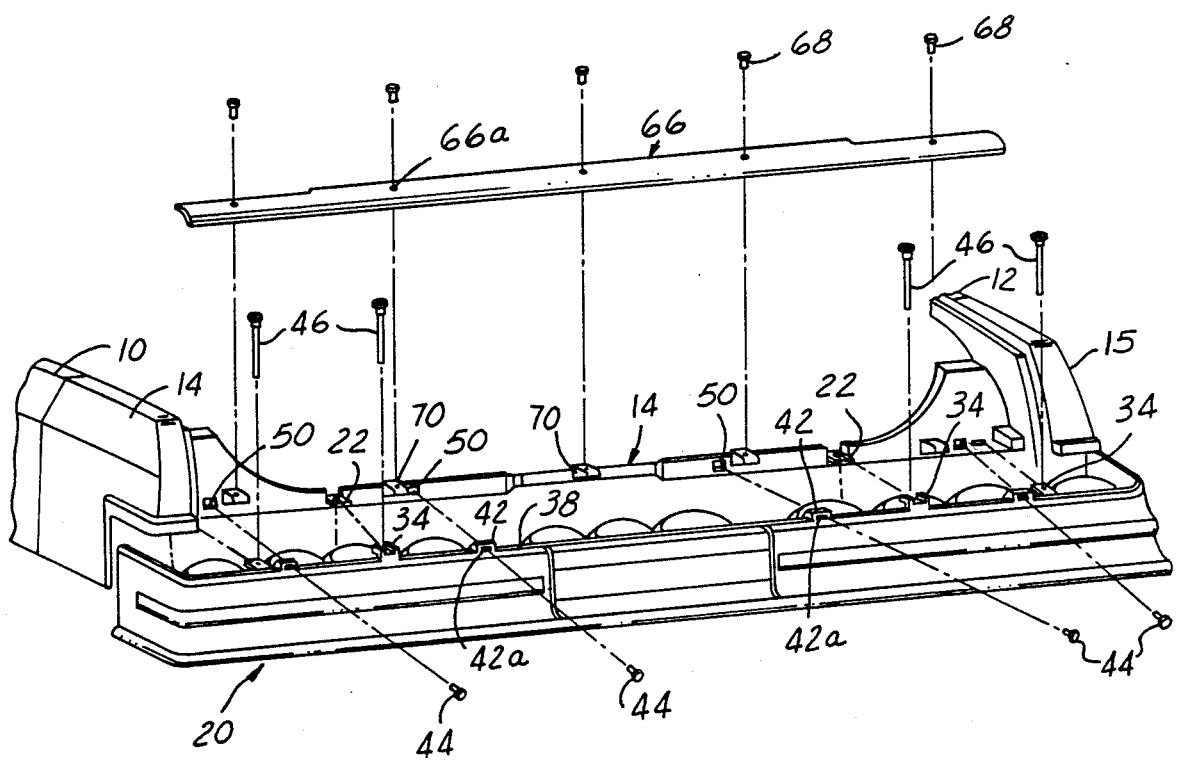
FIG. 2 is a fragmentary exploded view of part of the tail lamp assembly of FIG. 1.

Referring now to the drawings, FIGS. 1, 2 and 5 show the rear end of an automotive vehicle "A" which includes side and rear body structure including a left and right fender 10 and 12, a rear carrier panel 14, 15, a trunk or deck lid 16 including a vertical skirt 18, and a tail lamp assembly 20 that extends across and wraps around the rear of the vehicle. Rear panel 14 includes a plurality of laterally spaced rearwardly projecting mounting flanges 22, and a plurality of laterally spaced upwardly extending mounting brackets 24 to assist in mounting of the lamp assembly 20 to the vehicle.

The tail lamp assembly 20 comprises a tail lamp housing 26 and a tail lamp lens 28 which are snap fittingly connected, housing 26 carrying the tail lamp lens 28. Details of the connection are not discussed herein because it forms no part of this invention and is of conventional construction, the differences generally being as to dimensions for a specific vehicle. The tail lamp housing 26 is of a one-piece molded construction and includes a plurality of horizontally spaced generally curved socket portions 30 that support the tail lamp bulb (not shown) and include a plastic lamp socket 32 detachably secured to the adjacent socket portion in a conventional manner.

Tail lamp housing 26 includes forwardly extending upper and lower locating flanges 34 and 36, a generally horizontally extending top wall 38, a generally horizontally extending bottom wall 40, and laterally spaced flanges 42. Flanges 42 extend generally upwardly from the upper side of top wall 38 and have apertures 42a therein for receiving a threaded fastener 44 to connect assembly 26 directly to rear carrier panel 14. Forwardly extending flanges 34 and 36 are adjacent the upper and lower side respectively of housing 26 and at locations between or adjacent the horizontally spaced socket portions 30, the flanges 34 and 36 having substantially vertically aligned apertures 34a and 36a for receiving a respective axially elongated bolt 46.

Housing 26 is secured to the vehicle by a fastening arrangement in a manner to be hereinafter more fully described. Although only one fastened arrangement is shown in the drawings (see FIG. 5), it should be noted that several like fastening arrangements each at laterally spaced locations are employed to attach the housing 26 of tail lamp assembly 20 to the panel. The fastening arrangement comprises threaded fasteners 44, axially elongated bolts 46, a first mounting bracket 48 carried by the upper and lower locating flanges 34 and 36 on the housing 26, and a second mounting bracket 50 carried by the mounting bracket 24 forming a part of rear panel 14 and extending rearwardly therefrom.

Threaded fasteners 44 are received in brackets 42 extending from the top of housing 26 and suitably bolted or secured to threaded nuts 50 in the rear body structure of the vehicle A. This mounting fixedly secures housing 26 directly to panel 14 and prevents vertical motion relative to the panel.

The bolt or jack screw 46 has a head 46a, a first diameter portion 46b adjacent the head and provided with thread, and a second smaller diameter portion 46c which forms the forward end of the screw.

The mounting bracket 48 forms a one-piece spring clip having a body portion 52 that connects the first and second clip portions 54 and 56 together. Each clip portion 54 and 56 is U-shaped to define upper and lower horizontally disposed legs or sides which grippingly receive the respective flanges 34 and 36 on the housing member 26. The upper and lower sides of the respective U-shaped clip portions are, when in their free state position, spaced apart a distance which is slightly less than the width or the thickness of the respective flanges 34 and 36 so that when the U-shaped clip portions are pushed onto the flanges, the respective sides will biasingly grip with the top and bottom faces of the flanges. To facilitate pushing entry of the clip portions 54 and 56 onto the flanges, the free end of one or both of the sides are flared outwardly. The upper and lower sides of each clip portion 54 and 56 have vertically aligned apertures 54a and 56a respectively, which are aligned with the apertures 34a and 36a of the flanges 34 and 36. Apertures 54a in the lower sides of respective clip portions 54 are formed by threaded walls to threadably engage with the threaded first diameter portion 46b of bolt 46.

A pilot or guide 58 is connected to body portion 52. Advantageously, the guide includes a funnel 60 and frame 62 that assists in rapid downward vertical thrusting alignment of end 46c of the jack screw 46 through the apertures 56a and 36a respectively, of the U-shaped clip portion 56 and locating flange 36.

Mounting bracket 50 forms a one-piece spring clip that is U-shaped and includes a base 50a and a pair of spaced-apart legs 50b and 50c that extend from the base towards one another. When in their free state, legs 50b and 50c are spaced apart a distance which is slightly less than the width of the thickness of mounting bracket 24 extending upwardly from the vehicle so that when the clip portion is pushed onto the bracket the respective legs will biasingly grip the bracket. Lances 50d are deformed in the legs to form sharp edges that bite into the bracket whereby to hold the bracket in position thereon. A resilient leg 64 extends from the base 50a and is adapted to engage and be deflected by the bolt 46 passing through the clip portion 56, leg 64 engaging the smaller diameter portion 46c of the bolt 46.

A scuff plate or cover 66 conceals the mounting of the tail lamp assembly. Cover 66 is generally coextensive with panel 14 and is adapted to be secured in covering relation to upper locating brackets 34 by screws 68 being passed through apertures 66a of the plate and into threaded stops 70 extending forwardly from panel 14.

In operation, the clips 48 and 50 are mounted, respectively, on the respective locating flanges 34 and 36 of housing 26 and on the respective brackets 24 of the vehicle. The housing 26 is then positioned proximate the mounting flanges 22 and mounting brackets 24 extending rearwardly from the panel. Fasteners 44 are associated with brackets 42 extending along the top edge of the housing 26 and bolted directly to panel 14, thereby securing the top edge of tail lamp assembly 20 directly to the panel 14 in a manner that the flanges 34 of the assembly seat vertically above and upon the top face of the upper mounting flanges 22. Bolts 46 are then inserted vertically downward through respective of the vertically aligned apertures in brackets 48 and locating flanges 34 and 36 such that body 46b passes through the apertures in the clip portions 54 and 56 and is rotated so as to threadably engage with the threaded apertures 54a in the lower leg of the clip portions 54 whereby to draw the legs of that clip portion together and into tight gripping relation with its respective flange 22. Downward insertion of bolt ends 46c engage the resilient leg 64 of bracket 50 which operates to urge ends 46c and hence bottom 40 of tail lamp assembly 20 forwardly towards rear panel 14. An inturned portion 64a of leg 64 is driven into engagement with bracket 24 to enhance resistance to deflection of the leg and also aids in driving the bolt end 46c and thus the bottom 40 of tail assembly 20 forwardly towards rear panel 14.

While the above description constitutes the preferred embodiment of the invention, it will be appreciated that the invention is susceptible to modification, variation, and change without departing from the proper scope or fair meaning of the accompanying claims. For example, the clips could be integrally molded of plastic.

What I claim is:

1. In an automobile vehicle provided with a rearwardly projecting mounting flange, an upwardly extending mounting bracket, a spring clip mounted on said bracket and having a resilient leg extending therefrom, a lamp assembly having a top, a bottom, and forwardly projecting upper and lower locating flanges, said flanges having generally vertically aligned apertures therethrough, and mounting means for mounting the lamp assembly to said vehicle, said mounting means including an elongated threaded shaft having a body portion extending generally vertically downwardly through the apertures and an end portion which engages the spring leg, the mounting means characterized by: fastener means for rigidly securing the top of said assembly to said vehicle such that the bottom thereof is free to move in a horizontal direction towards said vehicle, a one-piece clip member having an upper and a lower clip portion, secured, respectively, to one and the other locating flanges, the shaft passing through the clip portions, and means for fixedly securing the shaft to said upper clip portion.

2. The invention as recited in claim 1 wherein said one-piece clip member further includes guide means for guiding the forward end of the shaft relative to said lower locating flange.

3. The invention as recited in claim 2 wherein said guide means includes a tapered funnel intermediate said clip portions and positioned to generally align the forward end of said shaft with the apertures and guide the shaft through the lower locating flange.

4. The invention as recited in claim 1 including positioning means for positioning the top of said assembly such that the upper locating flange is proximate said mounting flange.

5. The invention as recited in claim 4 wherein said positioning means cooperate to seat the upper locating flange above said mounting flange.

6. The invention as recited in claim 4 wherein said fastening means includes said positioning means, said positioning means including at least one threaded fastener which is adapted to engage the top of said assembly and said vehicle whereby to position said assembly at a predetermined location on said vehicle.

7. The invention as recited in claim 1 wherein the upper clip portion has a threaded aperture for threadably engaging said shaft whereby the lower end of said shaft can be positively advanced towards and into engagement with the leg of said spring clip.

8. The invention as recited in claim 1 wherein said fastener means functions independently of said threaded shaft for vertically positioning the lamp assembly on said vehicle.

9. The invention as recited in claim 1 wherein the shaft has a head and the upper clip portion includes top and bottom plates formed into a U-shape which grips the upper locating flange, each plate having an aperture aligned vertically with the other apertures and the wall defining the aperture in the bottom plate being threaded for engagement with the shaft whereby threadable downward advance of the shaft draws the head and plates together against the upper locating flange and drives the shaft end vertically downward against the leg whereby the bottom is biased forwardly.

10. In an automotive vehicle having upper and lower brackets for mounting a lamp assembly, said lamp assembly comprising:

a rear housing securable directly to the upper bracket and having a top, a bottom, upper and lower forwardly projecting flanges, and a socket for receiving a lamp, said flanges having generally vertically aligned apertures therethrough which are also aligned with an adjacent aperture in said upper bracket, fastening means for fastening said top to said vehicle whereby the upper flanges are disposed at a location above respective of said upper brackets, a first and second spring clip connected, respectively, to said flanges and said lower bracket, said first spring clip including first and second spring clip portions connected by a body portion, said clip portions engaging, respectively, one said upper and lower flange and having respective apertures aligned with the apertures in said flanges, said second spring clip being carried by said lower bracket at a location beneath an adjacent lower flange of said rear housing and having a deflectable leg located beneath the aperture in said lower flange, nut means associated with said first clip portion and aligned with the apertures in said lower flange, and a headed fastener having an elongated body extending through said apertures and the clip portions of said first spring clip, the fastener threadably engaging with said nut means whereby the head engages the first clip portion and the free end of the shaft engages the deflectable leg of the second spring clip, the leg of said second spring clip biasing the bottom of the lamp assembly generally forwardly towards said housing when the headed fastener is threadably secured to said nut means whereby said lamp lens is accurately positioned against said housing and aligned with adjacent body surfaces.

* * * * *